United States Patent [19]

Beretta

[11] Patent Number: 4,808,358
[45] Date of Patent: Feb. 28, 1989

[54] PROCESS TO OBTAIN MOLECULAR ORIENTATIONS IN PERFORATED PLATES MADE OF EXTRUDED PLASTIC MATERIAL

[75] Inventor: Mario Beretta, Sirtori, Italy

[73] Assignee: R D B Plastotecnica S.p.A., Vigano' Brianza, Italy

[21] Appl. No.: 38,510

[22] Filed: Apr. 15, 1987

[30] Foreign Application Priority Data

Aug. 7, 1986 [IT] Italy ............................ 21443 A/86

[51] Int. Cl.⁴ ...................... B29C 55/04; B29C 55/14
[52] U.S. Cl. ................................ 264/156; 264/210.5;
264/210.7; 264/235.6; 264/235.8; 264/237;
264/288.8; 264/289.3; 264/290.2; 264/346;
264/348; 264/DIG. 70; 264/DIG. 73;
264/DIG. 81; 425/66; 425/290; 425/297;
425/404
[58] Field of Search ............... 264/145, 154, 155, 156,
264/167, 210.2, 210.5, 210.7, 235, 235.6, 235.8,
237, 288.4, 288.8, 289.3, 290.2, 342 RE, 346,
348, DIG. 47, DIG. 70, DIG. 73, DIG. 81;
425/66, 290, 297, 302.1, 325, 404, DIG. 53

[56] References Cited

U.S. PATENT DOCUMENTS

| 3,085,292 | 4/1963 | Kindseth | 264/167 |
| 3,387,069 | 6/1968 | Stohr | 264/145 |
| 3,817,671 | 6/1974 | Lemelson | 425/66 |
| 4,093,695 | 6/1978 | Heirbaut | 264/346 X |
| 4,140,826 | 2/1979 | Liu | 264/288.8 X |
| 4,470,942 | 9/1984 | Beretta | 264/145 |
| 4,536,429 | 8/1985 | Mercer | 264/DIG. 81 |
| 4,574,100 | 3/1986 | Mercer | 264/DIG. 81 |
| 4,618,385 | 10/1986 | Mercer | 264/DIG. 81 |

FOREIGN PATENT DOCUMENTS

| 653621 | 3/1965 | Belgium | 264/210.7 |
| 57-176132 | 10/1982 | Japan | 264/288.8 |
| 905252 | 9/1962 | United Kingdom | 264/DIG. 81 |
| 918497 | 2/1963 | United Kingdom | 264/210.7 |

Primary Examiner—Jeffery Thurlow
Assistant Examiner—Leo B. Tentoni
Attorney, Agent, or Firm—Balogh, Osann, Kramer, Dvorak, Genova & Traub

[57] ABSTRACT

A process to obtain molecular orientations in perforated plates made of extruded plastic material includes a first heating of the plastic material at an extrusion temperature, the extruding of the plastic material in the form of a perforated plate, a first cooling of said plate, a second heating of the plate at the longitudinal orientation temperature, the longitudinal stretching of the plate, a second cooling of the plate at a temperature approaching room temperature, a third heating of the plate at the longitudinal stabilization temperature, a third cooling of the plate, a fourth heating of the plate at the transverse orientation temperature, the transverse stretching of the plate, a fourth cooling of the plate at the transverse stabilization temperature, and the final cooling of the plate.

5 Claims, 1 Drawing Sheet

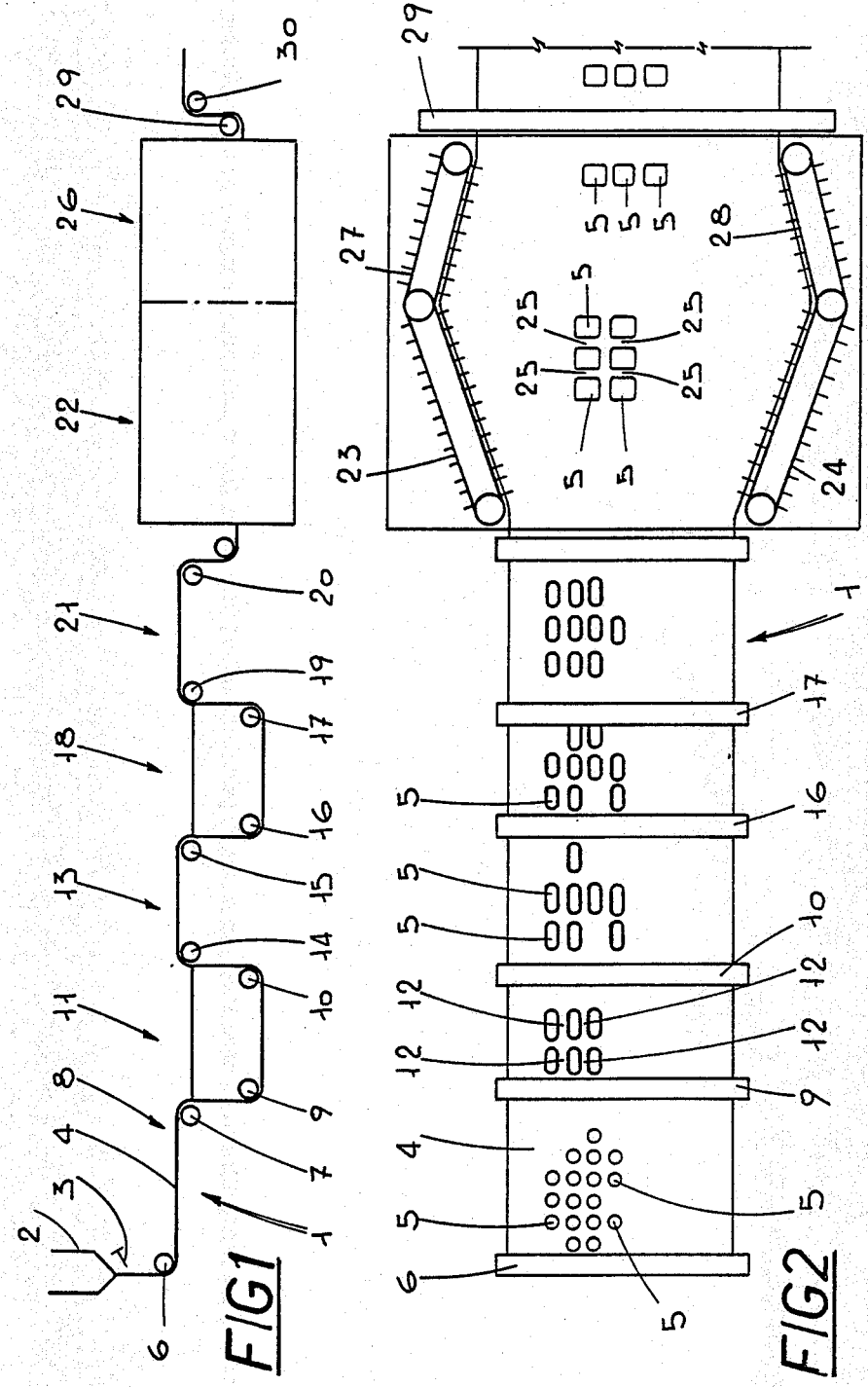

PROCESS TO OBTAIN MOLECULAR ORIENTATIONS IN PERFORATED PLATES MADE OF EXTRUDED PLASTIC MATERIAL

FIELD AND BACKGROUND OF THE INVENTION

The present invention relates to a process to obtain molecular orientations in perforated plates made of extruded plastic material and to the product obtained by said process.

It is known that in this field different methods presently exist allowing to obtain, directly from an extrusion step, a perforated plate made of plastic material. For example, one of these methods which has been the subject of the Italian patent application No. 20853A/81 and of the corresponding U.S. Pat. No. 4,470,942 in the name of the same applicant, essentially consists in extruding a plastic material in the form of a plate which, immediately after its coming out of the extruder head, is simultaneously stretched both in a longitudinal and transverse direction. Simultaneously to the stretching action the plate is submitted to the action of punches provided with reciprocating motion in the direction of the plate so as to repeatedly pass through the same in order to make a series of suitably distributed holes on the surface thereof. At the end of the tensioning step, the perforated plate is immediately cooled.

All plates obtained by the process roughly described hereabove or by other known processes are widely used in many fields. For example, they are used to fix boundaries, to accomplish safety barriers, barriers against the wind, the snow, etc.

In the above mentioned uses given by way of example only, the perforated plates made of plastic material have proved to be of low price, long lifetime and high aesthetic quality.

They are however subjected to some drawbacks.

One drawback is given by the fact that in some applications the mechanical resistance of known plates is not quite statisfactory. In greater detail, said plates have a rather reduced tensile strength so that, when they are used for example as safety barriers or barriers against the wind and the snow, they are easily subjected to plastic deformations due to the stresses to which they are submitted. When a perforated plate used as a barrier against the wind or in similar manner undergoes a plastic deformation it is no longer very functional so that it is necessary to replace it.

A further drawback resides in that the above mentioned plates can, under some conditions, undergo dimensional shrinkages, above all if they are exposed to the sun or to rather high temperatures.

It is also to be noted that, owing to what specified above, perforated plates of known type require a particular care at the setting, above all when used as safety barriers or the like. In fact they must be fastened to posts driven into the ground in a suitably spaced relationship, which must be perfectly parallelto each other and at right angles to the longitudinal extension of the respective plates, in order to avoid overtensions or localized deformations taking place on said plates.

In addition these plates can be improved as regards both their weight per surface unit and the amount of material used to produce a plate of given sizes.

OBJECT

The object of the present invention is to eliminate the above mentioned drawbacks by a process allowing to obtain, directly from the extrusion step, perforated plates made of plastic material exhibiting improved mechanical characteristics, a lower weight per surface unit and an improved dimensional stability in the course of time.

DESCRIPTION OF THE PREFERRED EMBODIMENTS

The foregoing and still further objects that will become more apparent in the following are substantially achieved by a process to obtain molecular orientations in perforated plates made of extruded plastic material comprising the following steps:

a first heating at the end of which the plastic material is brought to an extrusion temperature approaching its plasticization temperature;

extruding of the plastic material in the form of a perforated plate provided with a plurality of holes longitudinally and transversely aligned relative to the plate;

a first cooling of the perforated plate;

a second heating at the end of which the perforated plate is brought to a longitudinal orientation temperature ranging midway between the extrusion temperature and the temperature of the first cooling step;

longitudinal stretching of the perforated plate during which the molecular orientation of the material located between holes alignes transversely to the plate takes place;

a second cooling at the end of which the plate is brought to a temperature approaching room temperature;

a third heating at the end of which the plate reaches a longitudinal stabilisation temperature ranging between the temperature of the second heating step and that of the first cooling step;

a third cooling of the perforated plate at a temperature comprised between the longitudinal stabilisation temperature and room temperature;

a fourth heating at the end of which the perforated plate reaches a transverse orientation temperature ranging midway between the extrusion temperature and the temperature of the first cooling;

transverse stretching of the perforated plate during which the molecular orientation of the material located between holes aligned longitudinally to the plate takes place;

a fourth cooling at the end of which the plate attains a transverse stabilisation temperature slightly lower than the transverse orientation temperature;

final cooling of the perforated plate at room temperature.

By this process a perforated plate made of extruded plastic material is obtained which has a plurality of holes distributed so as to be aligned longitudinally and transversely to the plate, wherein said plate comprises areas that are molecularly oriented in a longitudinal direction each disposed between two transversely aligned holes as well as areas that are molecularly oriented in a transverse direction each disposed between two longitudinally aligned holes relative to said plate.

BRIEF DESCRIPTION OF THE DRAWINGS

Further features and advantages of the invention will become more apparent from the detailed description of a preferred embodiment of a process to obtain molecular orientations in perforated plates made of extruded plastic material according to the invention, given hereinafter by way of non-limiting example with reference to the accompanying drawings in which:

FIG. 1 diagrammatically shows a side view of the apparatus to produce perforated plates made of extruded plastic material according to the process in reference;

FIG. 2 is a diagrammatic top view of the apparatus seen in FIG. 1, devoid of the extruder head, showing the deformations that a plate undergoes during the processing.

Referring to the drawings, an apparatus to produce perforated extruded plastics plates according to the invention has been identified by reference numeral 1.

According to said process, a plastic material preferably selected from the group consisting of polyethylene, polypropylene, polyester and polyamide, undergoes a first heating at the end of which it is brought to the extrusion temperature. The value of the extrusion temperature is established depending upon the characteristics of the material used, so that the extrusion temperature may approach the plasticization temperature.

Then the plastic material is extruded through an extruder head diagrammatically shown in FIG. 1 and identified by reference numeral 2. Immediately downstream of the extruder head, perforating means 3 acts in known manner so that the plastic material is substantially extruded in the form of a perforated plate 4 provided with a plurality of holes 5. Holes 5, only some of which have been shown in FIG. 2, are distributed in such a way that they are longitudinally and transversely aligned relative to plate 4. In the example shown holes 5 are produced so that they originally have a substantially circular shape. Preferably the perforated plate 4 must originally have a thickness of 0.2 to 10 mm and the longitudinal and transverse pitch of holes must be between 3 and 100 mm.

Immediately after the extrusion step the perforated plate 4 guided by rollers 6 and 7 passes through a cooling station 8. During this step plate 4 undergoes a first cooling until it reaches a temperature preferably approaching room temperature.

Then plate 4, guided by second rollers 9 and 10, passes through a heating section 11. Here a second heating takes place and at the end of it plate 4 is brought to a longitudinal orientation temperature which is midway between the extrusion temperature and the temperature of the first cooling step. The value of the longitudinal orientation temperature can vary between 60° and 160° C., depending upon the characteristics of the material used in the processing.

While passing through said heating section plate 4 undergoes a longitudinal stretching by means of the guide roller 10 disposed downstream of the heating section 11 which preferably receives a rotational speed higher than the speed given to guide roller 9 and to the first guide rollers 6 and 7. During the longitudinal stretching of the plate, the molecular orientation of the material located between holes 5 that are transversely aligned relative to the plate, is achieved. That gives rise to areas on plate 4 that are molecularly oriented in a longitudinal direction, identified by 12 and disposed each between two holes 5 transversely aligned relative to plate 4. As clearly seen in FIG. 2, due to the longitudinal stretching of plate 4, holes 5 take an elongated form.

At the end of the longitudinal stretching step, plate 4, guided through a cooling section 13 by third rollers 14 and 15, undergoes a second cooling so that it reaches a temperature preferably approaching room temperature. Advantageously this cooling prevents all immediate plastic shrinkage of plate 4, which could instead occur if plate 4 should remain at high temperatures when the longitudinal stretching step is over.

In a preferred embodiment it is provided that a third heating should take place on plate 4 after the second cooling until a longitudinal stabilisation temperature ranging between the temperature of the second heating and that of the first cooling has been reached. In greater detail the value of the longitudinal stabilisation temperature should preferably be slightly lower than the longitudinal orientation temperature, and particularly between 50° and 155° C.

A third heating takes place when plate 4 is guided by means of fourth guide rollers 16 and 17, through a further heating section 18. Here plate 4 undergoes a dimensional stabilisation in the longitudinal direction and it slightly shrinks. That also involves a reduction in the length of holes 5 as compared to the length they had before being submitted to the second cooling.

It is provided that at the end of the dimensional stabilisation step plate 4 should have, in the molecularly oriented areas 12, a thickness varying from 0.05 mm to 4 mm and that the longitudinal pitch of holes 5 should be of 8 to 250 mm.

At the end of the longitudinal stabilisation step plate 4 is engaged by fifth guide rollers 19 and 20 and it passes through a cooling section 21. Thus it undergoes a third cooling and it is brought to a temperature approaching room temperature.

It is also possible to provide a fourth heating of plate 4 making it reach a transverse orientation temperature which is midway between the extrusion temperature and the temperature of the first cooling. As in the case of the second heating, the value of the transverse orientation temperature varies between 60° and 160° C. Said fourth heating is carried out by guiding plate 4 through a heating section 22 and it is combined with a transverse stretching of the plate, during which step it is achieved the molecular orientation of the material comprised between holes 5 that are longitudinally oriented relative to said plate 4. The transverse stretching can be obtained in a manner known in itself, by means of spreading apart drive chain lengths 23 and 24. Said chains are provided with gripping means adapted to hold the plate edges as said plate 4 is moved along the heating section 22. At the end of the transverse stretching step holes 5 exhibit, in the example shown, a quadrangular configuration with rounded edges and plate 4 is provided with areas 25 that are molecularly oriented in a transverse direction and are disposed each between two longitudinally aligned holes 5 relative to said plate 4.

Plate 4 is subsequently carried to a cooling section 26 where a fourth cooling takes place. At the end of this cooling plate 4 reaches a transverse stabilisation temperature which is slightly lower than the tranverse orientation temperature and preferably varies between 50° and 155° C.

As clearly seen in FIG. 2, plate 4 is moved along the fourth cooling section 26 by means of further slightly converging drive chain lengths 27 and 28.

It can be easily understood that while passing through said cooling section 26 under the above conditions plate 4 undergoes a slight dimensional shrinkage in the transverse direction. It is advantageously provided that at the end of the transverse stabilisation plate 4 should have, in the molecularly oriented areas 25, a thickness varying between 0.05 and 4 mm and that the transverse pitch of holes 5 should be between 2.5 and 100 mm.

Plate 4 is then engaged by sixth guide rollers 29 and 30 and it undergoes a final cooling so that it reaches the room temperature.

At this point plate 4 can be suitably packed, this step being omitted as it is not important to the ends of the present invention.

The invention attains the intended purposes By the process in question it is in fact possible to obtain molecular orientations in perforated plastic plates as they directly come out of an extruder mouth.

It is to be pointed out that the molecular orientation in plates allows the same to be given improved mechanical characteristics. More particularly, oriented plates in accordance with the process of the invention exhibit, as compared to known perforated plates, a remarkably improved tensile strength By this process permanent deformations resulting from traction efforts induced to the plates are minimized, in favour of spring deformations which tend to disappear when the state of effort that has produced the same disappears. This is of the greatest importance in some applications such as, for example, when they are used as safety barriers, barriers against the wind and so on.

Furthermore, the dimensional stabilisation steps to which plates 4 are submitted when passing through the heating section 18 and cooling section 26 give the same constant dimensional characteristics in the course of time even when they are subjected to rather high temperatures.

In addition, plates produced in accordance with the present process, as compared to known plates and taking into account the same surfaces, have a lower weight and require the use of smaller amounts of material Furthermore, when packed they have a reduced bulkiness as they can be produced with remarkably reduced thicknesses as compared to those of known plates.

Obviously many modifications and variations can be made to the invention as conceived without departing from the inventive idea characterizing it.

More particularly, plate 4 can be stretched in the longitudinal direction only, so that the process as above described ends after the third cooling of the plate when it passes through the cooling section 21.

It is also to be understood that the process must not necessarily be considered as a plurality of steps executed in a continuous sequential manner. In fact it is possible to stop it after anyone of the intermediate steps thus originating a semifinished product which can be resumed later on after any lapse of time starting from the step following said interruption.

What is claimed is:

1. A process to obtain molecular orientations in perforated extruded plastic plates, comprising the following steps:
    (a) a first heating at the end of which the plastic material is brought to an extrusion temperature approaching its plasticization temperature;
    (b) extruding of the plastic material in the form of a perforated plate;
    (c) a first cooling of the perforated plate;
    (d) a second heating during which the perforated plate is brought to a longitudinal orientation temperature ranging midway between the extrusion temperature and the temperature of the first cooling step;
    (e) longitudinal stretching of the perforating plate during which the molecular orientation of the material located between holes aligned transversely to the plate takes place;
    (f) a second cooling at the end of which the plate is brought to a temperature approaching room temperature;
    (g) a third heating at the end of which the perforated plate reaches a longitudinal stabilization temperature ranging between the temperature of the second heating and the temperature of the first cooling; and
    (h) a third cooling of the perforated plate at a room temperature.

2. A process to obtain molecular orientations in perforated extruded plastics plates, comprising the following steps:
    a first heating at the end of which the plastic material is brought to an extrusion temperature approaching its plasticization temperature;
    extruding of the plastic material in the form of a perforated plate;
    a first cooling of the perforated plate;
    a second heating during which the perforated plate is brought to a longitudinal orientation temperature ranging midway between the extrusion temperature and the temperature of the first cooling step;
    longitudinal stretching of the perforated plate during which the molecular orientation of the material located between holes aligned transversely to the plate takes place;
    a second cooling at the end of which the plate is brought to a temperature approaching room temperature;
    a third heating at the end of which the perforated plate reaches a longitudinal stabilization temperature ranging between the temperature of the second heating and the temperature of the first cooling;
    a third cooling of the perforated plate at a temperature comprised between the longitudinal stabilization temperature and room temperature;
    a fourth heating at the end of which the perforated plate reaches a transverse orientation temperature ranging midway between the extrusion temperature and the temperature of the first cooling;
    transverse stretching of the perforated plate during which the molecular orientation of the material located between holes aligned longitudinally to the plate takes place;
    a fourth cooling at the end of which the plate attains a transverse stabilisation temperature slightly lower than the transverse orientation temperature;
    final cooling of the perforated plate at room temperature.

3. The process as claimed in claim 2, wherein said plastic material is selected from the group consisting of polyethylene, polypropylene, polyester and polyamide.

4. The process as claimed in claim 2, wherein the longitudinal orientation temperature and the transverse orientation temperature are in the range between 60° C. and 160° C.

5. The process as claimed in claim 3, wherein the longitudinal stabilization temperature and the transverse stabilization temperature are slightly lower than the longitudinal orientation temperature and the transverse orientation temperature respectively said longitudinal stabilization temperature and said transverse stabilization temperature ranging from 50° to 155° C.

* * * * *